Aug. 11, 1953     A. E. YOUNG     2,648,437
AGITATING MECHANISM FOR POTATO DIGGERS
Original Filed July 6, 1945
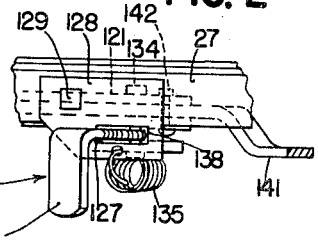
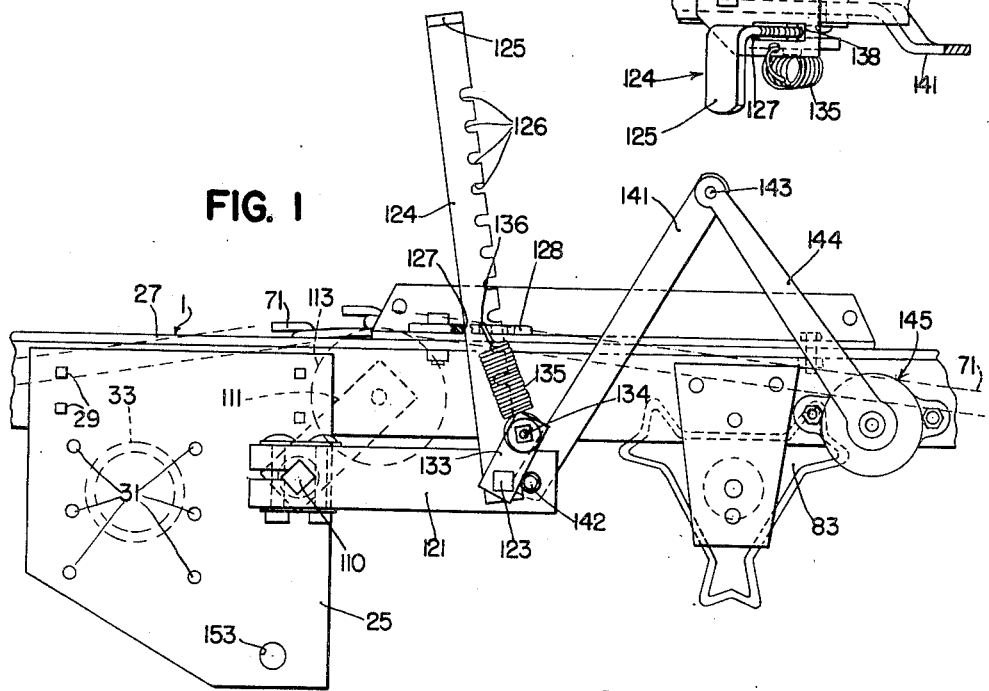
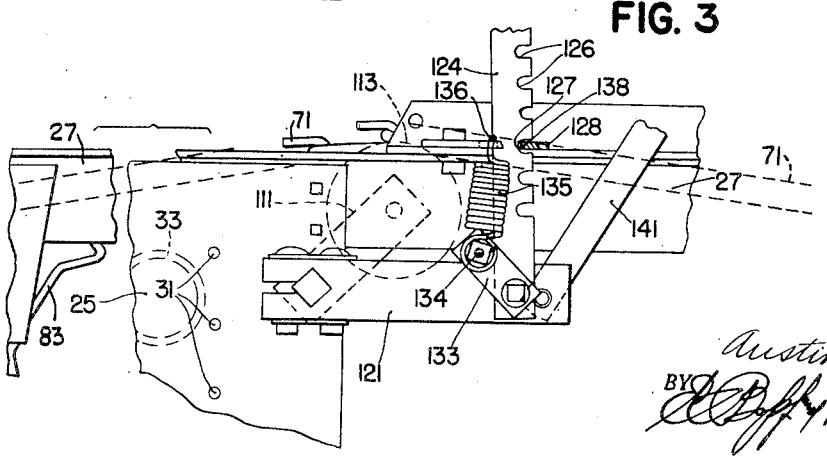

Patented Aug. 11, 1953

2,648,437

UNITED STATES PATENT OFFICE 2,648,437

AGITATING MECHANISM FOR POTATO DIGGERS

Austin E. Young, Syracuse, N. Y., assignor, by mesne assignments, to Deere & Company, Moline, Ill., a corporation of Illinois Original application July 6, 1945, Serial No. 603,472. Divided and this application May 29, 1947, Serial No. 751,292

14 Claims. (Cl. 209—308)

This application is a division of my co-pending application, filed July 6, 1945, Serial No. 603,472, now U. S. Patent 2,544,744, issued March 13, 1951.

The present invention relates generally to agricultural implements and more particularly to potato diggers and the like.

The object and general nature of the present invention is the provision of a potato digger having an elevator or conveyor chain and provided with a novel form of agitation and agitation control, whereby all of the excess soil raised with the potatoes by the digging blade or blades will be eliminated without excessive bruising or unnecessary handling of the potatoes or other root crop.

These and other objects and advantages of the present invention will be apparent to those skilled in the art after a consideration of the following detailed description, taken in conjunction with the accompanying drawings in which one form of the present invention has been shown by way of illustration.

Figure 1 is a fragmentary side view of a portion of a two-row potato digger showing particularly the agitation control with which, according to the principles of the present invention, the digger is provided.

Figure 2 is a fragmentary top view of the agitation control lever shown in Figure 1.

Figure 3 is a fragmentary view similar to Figure 1, showing an optional position of the agitation control mechanism.

Referring now to the drawings, the reference numeral 1 indicates the main frame of the digger. The main frame 1 includes right and left hand main frame bars, each of which, as shown in detail in the parent application identified above, comprises front and rear angles disposed, respectively, at the front and rear of the machine, with their horizontal flanges overlapping and secured together, as by bolts or the like. The rear frame angles are indicated in Figures 1-3 by the reference numeral 27. Two main wheel brackets 25 are secured, as by bolts 29, to the vertical flange of the main frame angle section 27 in depending relation. The two brackets 25 are rigidly connected together by a main tubular cross member 33 which preferably is welded at its ends to the brackets 25 to form therewith a rigid supporting and bracing structure. The main frame is supported centrally on a pair of ground wheels (not shown). The main frame 1 of the digger supports a digging shovel and supported on the latter and the rear portions of the frame 1 is a pair of potato conveyor or elevator chains 71. In the preferred construction, as shown in the above-mentioned parent application, the digging shovel comprises two sections whereby the digger is adapted to dig potatoes from two rows, the potatoes being delivered generally to the central portion of the machine and deposited onto the ground. The conveyors or chains 71 are of conventional construction and hence have been illustrated only fragmentarily in Figure 1. The chains 71 are supported on a plurality of rollers, more or less conventional, so far as the present invention is concerned. The front portions of the chains 71 engage front agitating sprockets (not shown) and rear agitating sprockets 83 which, during operation, successively engage portions of the associated elevator or conveyor chains and agitate the same in a vertical direction, as in conventional practice. The sprockets 83 are mounted on the angles 27 and a center main frame member (not shown). The rear portions of the conveyor chains 71 pass around and are driven by pairs of sprockets at the rear of the machine.

Mention was made above to the fact that the front and rear agitating sprockets impart a certain amount of vertical agitation to the potato chains 71 so as to shake loose dirt, debris and the like from the potatoes. The major work of agitating the potato chains is usually done by the front agitating sprockets and also the agitating sprockets forward of the tubular cross frame member 33. By the time the potatoes reach the rear part of the machine, usually practically all of the dirt and the like has been shaken from the potatoes. Under certain rather severe conditions, however, it may be necessary to provide continued agitation even at the rear of the machine. However, it is not always necessary to provide much agitation, and in some cases no agitation at all, at the rear ends of the chains 71 is necessary. Therefore, according to the principles of the present invention, I have provided adjacent the agitating sprockets 83 a new and useful mechanism which in the presently preferred structure takes the form of a resiliently mounted auxiliary chain-supporting means for controlling the amount of agitation that is imparted to the rear portions of the conveyor chains.

Referring now more particularly to the drawings, I provide an auxiliary supporting means for the rear portion of the chains 71 which auxiliary supporting means includes a cross shaft 110 that is mounted by suitable bearing means carried by the rear portions of the main wheel brackets 25, and two pairs of arms 111 that are fixed, as by welding, to the shaft 110, as best shown in Figure 1. Secured to the swinging end of each of these arms is a bearing bracket on which a smooth chain-supporting roller 113 is journaled. Each of these rollers 113 is disposed in alignment with the other associated agitating sprockets and rollers, but the arms 111 are of such length that by rocking the cross shaft 110 in one direction or the other, the rollers 113 may be raised into a sufficiently high position to lift both chains 71 entirely off of the rear agitating sprockets 83 and/or at least partially off of the front agitating sprockets. Lowering the rollers 113, as by swinging the cross shaft 110 in a clockwise direction (Figures 1 and 2) will serve to let the chains 71 down to a greater or lesser extent onto the agitating sprockets 83 and thus cause the latter to impart more or less agitation to the chains.

The cross shaft 110 is provided at one end with an operating arm 121 which is apertured at its swinging end to receive a pivot or bolt 123 by which the lower end of an operating and adjusting link 124 is connected thereto. The upper end of the member 124 is formed with a handle section 125 and also a plurality of notches 126 along its forward edge. As shown in Figure 1, the operating link 124 passes upwardly through the apertured portion 127 of a plate 128 which is bolted, as at 129, to the main frame. Swingably mounted on the pivot 123 is a short arm or abutment 133 which is apertured to receive a bolt 134 by which the lower end of a spring 135 is connected thereto. The upper end of the spring 135 is anchored, as at 136, to the laterally outer portion of the plate 128. When the arm 133 occupies the position, relative to the link 124, shown in Figure 1, the head of the bolt 134 engages the forward edge of the link 124 and hence the tension in the spring 135 tends to keep the rear edge of the link 124 against the rear end of the slot 127 through which the link 124 extends. The spring 135 therefore acts against the abutment arm 133 to keep the notched portion on the link 124 away from the front edge 138 of the slot 127. When in this position, the link 124 does not prevent the up and down movement of the arm 121 and the consequent rocking of the shaft 110. However, the spring 135 also acts through the arm 121 and associated parts to hold the agitation control rollers 113 in an upper position, but the spring 135 yields downwardly proportionately to the amount or weight of material on the chains 71. Therefore, with the parts arranged as shown in Figure 1, an automatic agitation control is provided inasmuch as the greater the load on the chains the greater the amount of agitation, since the more the spring 135 yields the more the chains 71 will be permitted to lower and the greater their amount or extent of contact with the associated agitating sprockets 83.

If desired, a link 141 may be connected, as at 142, to the rear end of the arm 121 and extended upwardly to a point, as at 143, where it may be connected to the arm 144 of a shock absorber mechanism 145, which may be of conventional construction, acting as a dashpot to prevent or restrain too rapid oscillation of the shaft 110 and arm 121. Preferably, the shock absorber 145 permits free movement in the downward direction of the but restrains sudden upward movement of the rollers 111.

Referring now to Figure 3, the spring 135 and associated parts are so arranged that the arm 133 may be swung around to a rear position, with the head of the bolt 134 engaging the front edge of the link 124 so that the spring 135 now acts against the abutment arm 133 in its rear position for holding the link so that one or the other of its several notches 126 interlocks with the forward end 138 of the slot 127. By virtue of this arrangement, the arm 121 may be held against oscillation and the rollers 111 maintained in a given position, which position may be adjusted manually by momentarily releasing the link 124 and raising or lowering the same so as to raise or lower the rollers 111. The link 124 is easily accessible to an operator on the seat of the machine.

While I have shown and described above the preferred structure in which the principles of the present invention have been incorporated, it is to be understood that my invention is not to be limited to the particular details shown and described above.

What I claim, therefore, and desire to secure by Letters Patent is:

1. A potato digger comprising frame means, non-circular agitating sprocket means rotatably carried thereby, a conveyor chain carried by said frame means and adapted to pass over said agitating sprockets for rotating the latter which serves thereby to impart agitation to said chain and the material conveyed thereby, an auxiliary chain-supporting means, means connecting said chain-supporting means for generally vertical movement relative to said frame means while at least partially supporting said chain in different generally vertical positions relative to said agitating sprockets, and spring means connected to act generally vertically between said frame means and said chain-supporting means for urging the latter upwardly, said spring means being adapted to yield generally proportionately to the weight of the chain and material thereon, whereby the conveyor chain and the material thereon is supported in different positions relative to the associated agitating sprockets, so that when the chain is more heavily loaded the amount of agitation imparted thereto by said sprockets is increased.

2. For use in a potato digger or the like which includes means serving as a frame, the improvement comprising a part shiftable relative to said frame means, a locking link pivoted to said part and having a plurality of notches therein, means serving as an abutment on said frame means with which the notched portion of said link is adapted to engage for locking said part against movement, said link being swingable away from said abutment means to provide for moving said part, means on said frame means for limiting the movement of said link away from said abutment means, a part shiftable relative to said frame means into two positions, one in which said part engages one side of said locking link and the other position being one in which said part engages the other side of said locking link, and spring means adapted to act between said frame and said part for optionally urging said locking link either into engagement with said abutment means or out of engagement therewith.

3. An attachment for controlling the generally vertical position of a conveyor element relative to conveyor-contacting rotary agitating elements carried by the frame of the conveyor, said attachment comprising a part engageable with said conveyor element and movable relative to said frame for holding said conveyor element in different positions relative to said agitating elements, a latch member pivotally connected with said part and movable relative thereto into two positions, one engaging said frame for locking said part against movement and the other in which said latch member is movable with said part relative to said frame, a spring member, means for connecting one end of the latter to said frame, and optionally disposable means connecting the other end of said spring member to said latch member for yieldably urging the latter into either one or the other of said positions of the latch member, said last named means including an arm receiving said other end of said spring and shiftable between one position, in which said arm bears against said latch member at one side of a line connecting said one end of said spring and the point of pivotal connection of said latch member with said part, and another position in which said arm bears against said latch member at the other side of said line.

4. An attachment for controlling the generally vertical position of a conveyor element relative to conveyor-contacting rotary agitating elements carried by the frame of the conveyor, said attachment comprising a part engageable with said conveyor element and movable relative to said frame for holding said conveyor element in different positions relative to said frame, a latch member pivotally connected with said part and movable relative thereto into two positions, one engaging said frame for locking said part against movement and the other in which said latch member is movable with said part relative to said frame, a spring member extending generally alongside said latch member, means for connecting one end of the spring member to said frame, and means connecting the other end of said spring member to said latch member at one side of the pivot connection between the latch member and said part, said spring member acting through said latch member for yieldably urging the latch member and said part for movement toward said conveyor element and holding said latch member out of engagement with said frame.

5. An attachment for controlling the position of a conveyor element movable along a frame, said attachment comprising a part movable relative to said frame and engageable with said element for holding it in different positions relative to the frame, a latch member, means connecting the latter to said part for movement relative thereto about an axis into two positions, one engaging said frame for locking said part against movement and the other in which said latch member is movable with said part relative to said frame, a spring member, means for connecting one end of the latter to said frame, a spring-receiving member connected with said latch member and shiftable into positions on opposite sides of said axis, and means connecting the other end of said spring to said spring-receiving member, whereby said spring member acts through said spring-receiving member against said latch member for yieldably urging the latter into either one or the other of said positions of the latch member.

6. An attachment for controlling the position of a frame-supported conveyor element relative to associated rotatable agitating elements, said attachment comprising a part engageable with said conveyor element and movable relative to said frame for holding said conveyor element in different positions relative to said agitating elements, a latch member connected with said part and movable relative thereto about a pivot axis into two positions, one in which said latch member engages said frame for locking said part against movement and the other in which said latch member is movable with said part relative to said frame, a spring member, means for connecting one end of the latter to said frame, means connected with said latch member and shiftable into positions on opposite sides of said pivot axis and receiving the other end of said spring for connecting the other end of said spring member to said latch member for yieldably urging the latter into either one or the other of said positions of the latch member, said spring in either position of said latch member acting through the latter for urging said part upwardly toward the conveyor element and serving to yieldingly bias the latter for upward movement relative to the agitating elements when the latch member is held in said other position.

7. The combination with conveying and agitating apparatus of the type including a frame, a conveyor element movable over said frame, and rotatable agitating elements carried by said frame under said conveyor element and adapted to agitate the latter whenever contact between the conveyor element and said agitating elements causes the latter to be rotated, of a part engageable with said conveyor element and movable relative to said frame for holding said conveyor element in different positions relative to said agitating elements, a latch member connected with said part and movable relative thereto into two positions, one engaging said frame for locking said part against movement and the other in which said latch member is movable with said part relative to said frame, a spring member, means for connecting one end of the latter to said frame, and optionally disposable means connecting the other end of said spring member to said latch member for yieldably urging the latter into either one or the other of said positions of the latch member.

8. The combination with conveying apparatus of the type including a frame and a conveyor element movable over said frame, of a part engageable with said conveyor element and movable relative to said frame for holding said conveyor element in different positions relative to said frame, a latch member connected with said part and movable relative thereto into two positions, one engaging said frame for locking said part against movement and the other in which said latch member is movable with said part relative to said frame, a spring member, means for connecting one end of the latter to said frame, and optionally disposable means connecting the other end of said spring member to said latch member for yieldably urging the latter into either one or the other of said positions of the latch member.

9. The combination with conveying apparatus of the type including a frame and a conveyor element movable over said frame, a part engageable with said conveyor element and movable relative to said frame for holding said conveyor element in different positions relative to said frame, a latch member, means connecting the latter to said part for movement relative thereto about an axis into two positions, one engaging said frame for locking said part against movement and the other in which said latch member is movable with said part relative to said frame, a spring member, means for connecting one end of the latter to said frame, and means connected with said latch member and shiftable into positions on opposite sides of said axis and receiving the other end of said spring for connecting the other end of said spring member to said latch member for yieldably urging the latter into either one or the other of said positions of the latch member.

10. The combination with conveying and agitating apparatus of the type including a frame, a conveyor element movable over said frame, and rotatable agitating elements carried by said frame under said conveyor element and adapted to agitate the latter whenever contact between the conveyor element and said agitating elements causes the latter to be rotated, of a part engageable with said conveyor element and movable relative to said frame for holding said conveyor element in different positions relative to said agitating elements, a latch member connected with said part and movable relative thereto into two positions, one engaging said frame for locking said part against movement and the other in which said latch member is movable with said part relative to said frame, a spring member, means for connecting one end of the latter to said frame, means connected with said latch member and shiftable into positions on opposite sides of said axis and receiving the other end of said spring for connecting the other end of said spring member to said latch member for yieldably urging the latter into either one or the other of said positions of the latch member, said spring in either position of said latch member acting through the latter for urging said part upwardly toward the conveyor element and serving to yieldingly bias the latter for upward movement relative to the agitating elements when the latch member is held in said other position.

11. Means for controlling a conveyor element movable along a frame, comprising a part rockably attachable to said frame, conveyor engaging and lifting means carried by said part, an arm fixed to move with said part and swingable therewith alongside said frame, a latch member pivotally connected with the outer end of said arm and having one edge notched and the other edge smooth, abutment means adapted to be carried by said frame adjacent said arm and having an elongated slot receiving said latch member, the latter being shiftable in said slot from one position, in which the notched portion of said latch member is lockingly engaged with said abutment means at one end of said slot, to another position in which the smooth portion of said latch member shiftably engages said abutment means at the other end of said slot, and optionally operable means for holding said latch member in said positions at the ends of said slot.

12. Means for controlling a conveyor element movable along a frame, comprising a part rockably attachable to said frame, conveyor engaging and lifting means carried by said part, an arm fixed to move with said part and swingable therewith alongside said frame, a latch member pivotally connected with the outer end of said arm and having one edge notched and the other edge smooth, abutment means adapted to be carried by said frame adjacent said arm and having an elongated slot receiving said latch member, the latter being shiftable in said slot from one position, in which the notched portion of said latch member is lockingly engaged with said abutment means at one end of said slot, to another position in which the smooth portion of said latch member shiftably engages said abutment means at the other end of said slot, spring means adapted to be connected at one end with said frame, and means bearing against one side of said latch member and connected with said spring and arm for urging said part into conveyor-engaging position and yieldably holding said latch member in a position with its smooth portion engageable with said abutment means and shiftable therealong when said spring means yields in response to changes in the weight of material on said conveyor element, said means being shiftable so as to bear against said latch member at the other side of said latch member and yieldably hold the notched portion of the latter interlocked with said abutment means.

13. Means for controlling a conveyor element movable along a frame, comprising a rockshaft rockably attachable to said frame, conveyor engaging and lifting means carried by said shaft, an arm fixed to said shaft and swingable therewith alongside said frame, a latch member pivotally connected with the outer end of said arm and having one edge notched and the other edge smooth, a plate adapted to be fixed to said frame adjacent said arm and having an elongated slot receiving said latch member, the latter being shiftable in said slot from one position, in which the notched portion of said latch member is lockingly engaged with said plate at one end of said slot, to another position in which the smooth portion of said latch member shiftably engages said plate at the other end of said slot, and optionally operable means for holding said latch member in said positions at the ends of said slot.

14. Means for controlling a conveyor element movable along a frame, comprising a part rockably attachable to said frame, conveyor engaging and lifting means carried by said part, an arm fixed to move with said part and swingable therewith alongside said frame, a latch member pivotally connected with the outer end of said arm and having one edge notched and the other edge smooth, abutment means adapted to be carried by said frame adjacent said arm and adapted to receive the notched portion of said latch member in interlocking relation therewith, said latch member being movable out of locking engagement with said abutment, spring means adapted to be connected at one end with said frame, and means bearing against one side of said latch member and connected with said spring and arm for urging said part into conveyor-engaging position and yieldably holding said latch member in a position out of locking engagement with said abutment means, said means being shiftable to the other side of said latch member for yieldably urging the notched edge thereof toward said abutment means.

AUSTIN E. YOUNG.

References Cited in the file of this patent

UNITED STATES PATENTS

| Number | Name | Date |
|---|---|---|
| 31,855 | Weiland | Mar. 26, 1861 |
| 1,232,052 | Landahl | July 3, 1917 |
| 1,241,883 | Rice | Oct. 2, 1917 |
| 1,314,270 | Kendall | Aug. 26, 1919 |
| 1,454,175 | Kovar et al. | May 8, 1923 |
| 1,540,247 | Bowman | June 2, 1925 |
| 1,547,584 | Hoover | July 28, 1925 |
| 1,715,218 | Wright et al. | May 28, 1929 |
| 1,796,127 | Stephenson | Mar. 10, 1931 |
| 2,077,462 | Cook | Apr. 20, 1937 |
| 2,172,435 | Cook | Sept. 12, 1939 |
| 2,312,031 | Coutcher | Feb. 23, 1943 |
| 2,382,710 | Haddock | Aug. 14, 1945 |
| 2,468,639 | Sample | Apr. 26, 1949 |